United States Patent [19]

Grossmann et al.

[11] Patent Number: 4,856,195
[45] Date of Patent: Aug. 15, 1989

[54] HANDLE ARRANGEMENT FOR PORTABLE POWER TOOL

[75] Inventors: Horst Grossmann, Hunfelden; Michael Stirm, Oberursel, both of Fed. Rep. of Germany

[73] Assignee: Black & Decker Inc., Newark, Del.

[21] Appl. No.: 249,644

[22] Filed: Sep. 26, 1988

Related U.S. Application Data

[63] Continuation-in-part of Ser. No. 116,803, Oct. 30, 1987.

[30] Foreign Application Priority Data

Nov. 11, 1986 [EP] European Pat. Off. ........ 86115652.9

[51] Int. Cl.$^4$ ............................................. B27B 19/00
[52] U.S. Cl. ......................................... 30/369; 30/383; 16/111 R
[58] Field of Search ........................ 30/369, 381–387, 30/392; 173/162.2; 16/111 R

[56] References Cited

U.S. PATENT DOCUMENTS

| D. 268,089 | 3/1983 | Sato | D8/65 |
|---|---|---|---|
| 3,152,650 | 10/1964 | Savidge | 173/162.2 |
| 3,881,250 | 5/1975 | Frederickson | 30/383 |
| 3,934,344 | 1/1976 | Inaga | 30/381 |
| 3,945,119 | 3/1976 | Nagashima et al. | 30/383 |
| 3,991,469 | 11/1976 | Frederickson | 30/381 |
| 4,449,062 | 5/1984 | Wilson | 307/328 |
| 4,693,006 | 9/1987 | Wehle | 30/383 |

FOREIGN PATENT DOCUMENTS

| 3638394 | 5/1988 | Fed. Rep. of Germany . | |
|---|---|---|---|
| 954220 | 9/1982 | U.S.S.R. | 30/383 |
| 1047941 | 11/1966 | United Kingdom . | |
| 2180791 | 9/1985 | United Kingdom . | |

OTHER PUBLICATIONS

Chip & Clean pamphlet and two pages of Owners Manual, 1985.

Primary Examiner—Douglas D. Watts
Assistant Examiner—Michael D. Folkerts
Attorney, Agent, or Firm—Edward D. Murphy; Charles E. Yocum; Edward D. C. Bartlett

[57] ABSTRACT

A hand-held power tool, for example a reciprocating saw, a chain saw, or a hedge trimmer, has a rear handle and a T-shaped forward handle formed by a forwardly directed strut with a crossbar. Looped side handles are detachably mounted on each side of the tool. Upper legs of the side handles are detachably connected to opposite ends of the forward handle crossbar. Lower legs of the side handles are detachably connected to bosses on opposite sides of the tool's housing adjacent its bottom. The side handles can be mounted with screws, or interlocking elements, or a combination of both. Preferably the forward handle is integrally formed with an upper part of the tool's housing. Both side handles may be omitted and the tool held by the forward and rear handles, this reducing the width of the tool.

28 Claims, 12 Drawing Sheets

HANDLE ARRANGEMENT FOR PORTABLE POWER TOOL

RELATED APPLICATION

This is a continuation-in-part of application Ser. No. 116,803 filed Oct. 30, 1987. Insofar as some of the disclosure of said application Ser. No. 116,803 has been omitted from the present application, such omitted disclosure is hereby incorporated herein by reference.

FIELD OF THE INVENTION

The invention relates to portable power tools, such as for example reciprocating saws, chain saws, hedge trimmers, etc., and handle arrangements therefor. The invention is particularly applicable to side handle arrangements for hand-held power tools.

BACKGROUND OF THE INVENTION

It is known to provide some portable power tools with side handles. For example, a chain saw may be provided with a side handle on one or both sides, and such may be formed as part of a combined side and top handle extending over and spaced above the top of the motor housing of the chain saw, see for example U.S. Pat. No. 3,881,250. A power hedge trimmer may be provided with a handle in the shape of an inverted U which forms a top handle and opposite side handles, see for example U.S. Pat. No. 4,449,062. A portable reciprocating power saw may be provided with a top and forward handle as proposed in British Pat. 1,047,941. These hand-held power cutting tools are usually also provided with a rear handle, the side handle arrangement being disposed between the rear handle and the cutting means.

SUMMARY OF THE INVENTION

It is an object of the present invention to provide an improved handle arrangement for hand-held power tools.

It is another object of the present invention to provide a handle arrangement having one or a pair of detachable side handles.

Another object of the invention is to provide a handle arrangement with separately mountable, looped side handles, and an upper, central mounting member which serves as an upper forward handle whether the side handles are omitted or present.

There is provided by the present invention a hand-held power tool, for example a reciprocating saw, a chain saw, a hedge trimmer or the like, having a rear handle and a T-shaped forward handle formed by a forwardly directed strut with a crossbar. Looped side handles are detachably mountable on opposite sides of the tool. Upper legs of the side handles are detachably connectable to opposite ends of the forward handle crossbar. Lower legs of the side handles are detachably connected to bosses on opposite sides of the tool's housing. The side handles may be mounted with screws, or interlocking elements, or a combination of both.

Preferably the forward handle is integrally formed with an upper portion of the tool's housing.

Both side handles may be omitted and the tool held by the forward and rear handles, this reducing the width of the tool.

According to a particular aspect of the present invention, there is provided a hand-held power tool, comprising a housing containing a motor, means for cutting extending forwardly from the housing in a lengthwise direction of the tool, and transmission means for driving the cutting means from the motor. A rear handle preferably extends rearwardly from the housing in the lengthwise direction. A front handle is spaced from the rear handle and extends forwardly from an upper portion of the housing. A pair of looped side handles are attachable to and detachable from opposite sides of the tool at a location between the rear handle and the cutting means. Each side handle has upper and lower legs, and there are upper securing means for securing end portions of the upper legs to the front handle and lower securing means for securing end portions of the lower legs to the housing.

According to another aspect of the present invention, there is provided a hand-held power tool, comprising a housing supporting a motor, means for cutting and extending in a lengthwise direction forwardly from the housing and being connected to the motor to be driven thereby, a forward handle mounted on the housing, the handle comprising a strut connected with and extending from the housing, and a crossbar mounted on the strut and extending transversely thereto and to said lengthwise direction, the crossbar having at opposite ends side handle mounting surfaces, and means associated with each of the mounting surfaces for enabling a leg of a side handle to be secured to the crossbar with an end of the leg abutting one of the mounting surfaces.

Advantageously, the leg may form an extension of the crossbar when secured thereto.

Preferably, the mounting surfaces are planar and extend transversely to the crossbar.

The enabling means may comprise an orifice in each of the mounting surfaces.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which the same reference characters in different FIGS. indicate like parts.

DETAILED DESCRIPTION OF THE PREFERRED EMBODIMENTS

Figure 17:
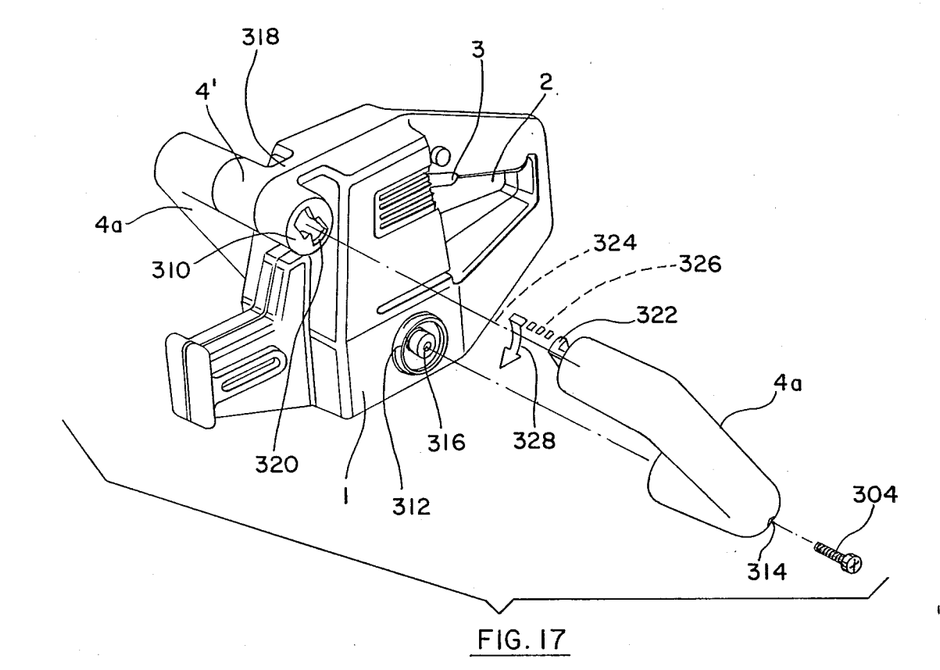
FIG. 17 is a partially exploded view of the motor housing, and handle arrangement of a second embodiment of the invention.
Figure 18:
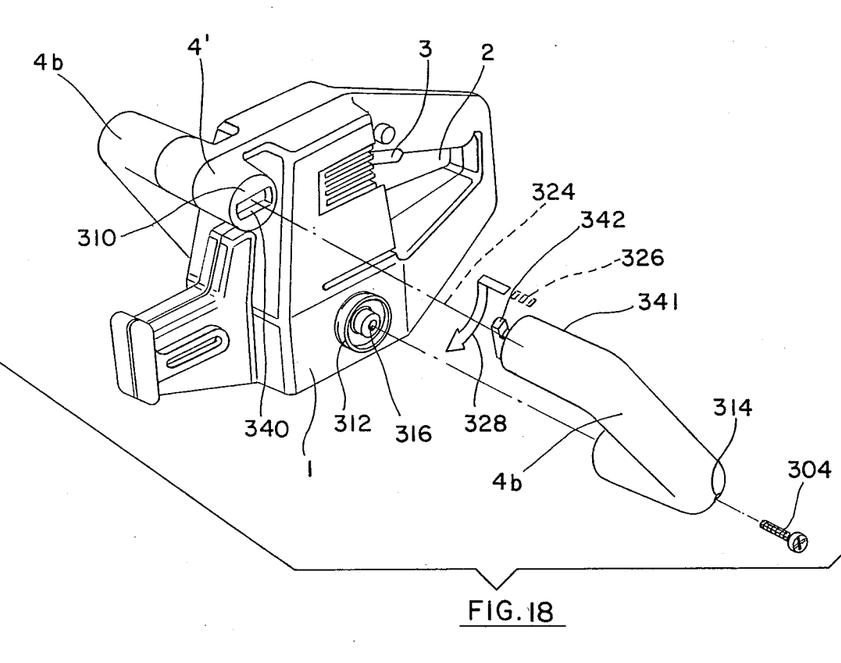
FIG. 18 is a similar view to FIG. 17 of a third embodiment of the invention.
Figure 19:
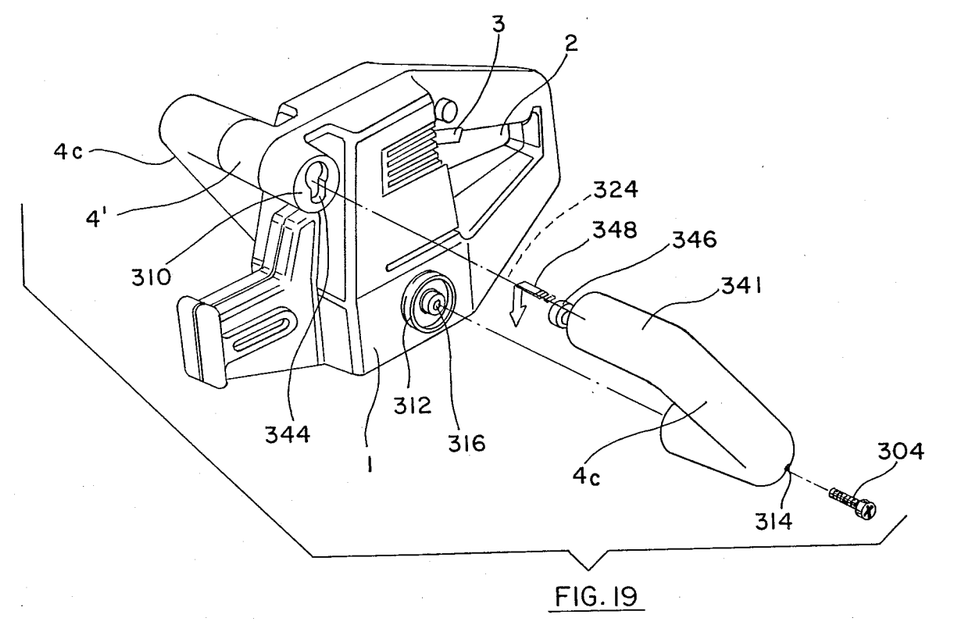
FIG. 19 is a similar view to FIG. 17 of a fourth embodiment of the invention.

The preferred, and simplest, embodiment of the present invention is shown in FIGS. 1 to 6. FIGS. 17 to 19 show three modifications of the handle arrangement of FIGS. 1 to 6.

The handle arrangement embodiment of FIGS. 1 to 6 is illustrated as employed in a reciprocating saw having a pair of oppositely reciprocating saw blades.

As shown in FIGS. 1 to 5, the saw has a housing 1 built up in the conventional manner from half-shells 1a, 1b and which houses an electric motor 10 (but optionally an internal combustion motor could be employed), a gear arrangement and cutting blade holders 15 and 18. On the rear part of housing 1 is provided a handle opening 2 into which extends in the conventional way a manually operated trigger element 3 of an on-off switch 3'(see FIG. 5). On the front part of housing 1 is provided a diagrammatically indicated mounting arrangement 5 for fitting a support plate 6. This support plate 6 supportingly engages around the upper areas of a pair of oppositely reciprocating saw blades 7.

Figure 3:
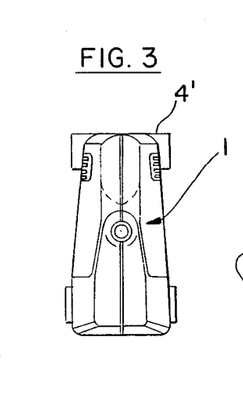
FIG. 3 is a rear end view of the saw of FIG. 1 from the right in FIG. 1, the support handles being removed.
Figure 4:
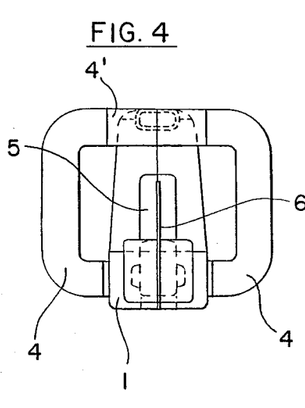
FIG. 4 is a front end view of the saw of FIG. 1 from the left in FIG. 1.

Lateral support handles 4 extend from housing 1 between the rear handle opening 2 and the support plate 6. The two lateral handles 4 are individually detachable to temporarily reduce the overall width dimension of the whole saw on either or both sides to enable closer cuts to be made, e.g. when sawing a branch from a tree. This can be accomplished by simply removing two screws 302,304 retaining either handle 4, as can be appreciated from the right-hand side of FIG. 5. When both handles 4 are so removed, a spacing handle portion 4'(see FIGS. 2,3,4 and 5), to which the upper leg of each handle 4 is attachable, serves as a temporary forward handle. FIG. 3 shows both side handles removed.

Figure 5:
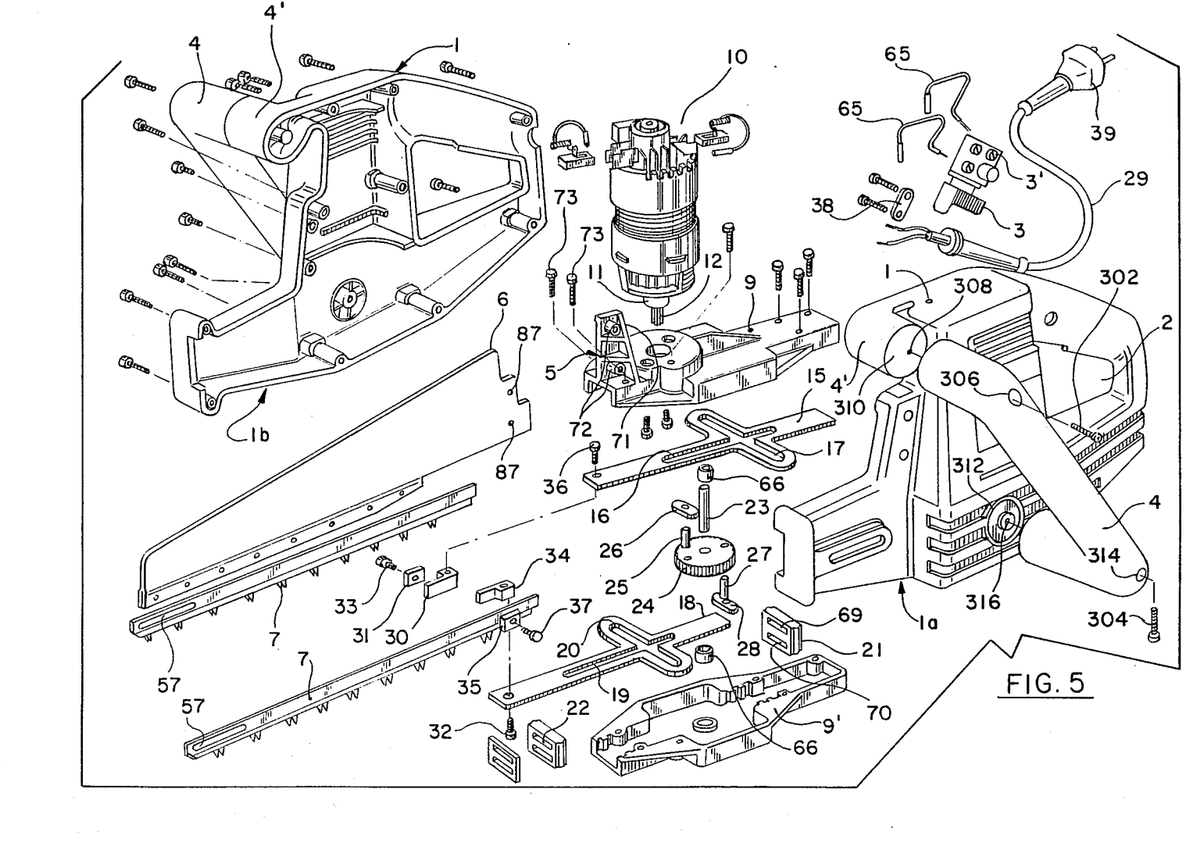
FIG. 5 is an exploded view of the saw of FIGS. 1 to 4 with some parts omitted and others simplified for clarity.

Each side handle 4 is in the form of a U-shaped loop turned on its side and inclined upwardly forwards, as can clearly be appreciated from FIGS. 1, 2, 4 and 5. The upper leg of each U-shaped side handle 4 is longer than the lower leg, as clearly shown in FIG. 4. The spacing handle portion 4', half of which is integrally formed on each housing half shell 1a, 1b as shown in FIG. 5, spaces apart the upper legs of the two side handles 4. Each such upper leg is secured to the appropriate half of the handle portion 4' by the respective screw 302 entering through an aperture 306 in the respective side handle, passing along the upper leg of that side handle, and being screwed into a central orifice 308 in an outer mounting side surface 310 of the handle portion 4'. The lower leg of each side handle 4' is mounted on and secured to a boss 312 formed integrally on the outer side of the respective housing half shell 1a, 1b adjacent the bottom of that half shell. The respective screw 304 enters through a lower aperture 314 in the respective side handle, passes along the lower leg thereof, and is screwed into a central orifice 316 in the boss 312. As will be clear from FIGS. 1 and 5, each boss 312 is below and rearward of each mounting side surface 310.

As will be appreciated, each side handle 4 is located lengthwise of the cutting tool between the cutting means 7 and the rear handle 2.

Thus, the power tool can be grasped during operation by both hands of the user, one hand grasping one of the pair of side handles 4, and the other hand grasping the rear handle 2. Alternatively, the spacing handle portion 4' can be used as a forward, upper handle, the power tool then being held by grasping this handle portion 4' and the rear handle 2. Thus, either side handle 4 can be removed, or omitted completely from the power tool, and the cutting tool grasped between the rear handle 2 and either the remaining side handle 4 or the forward upper handle 4'.

Further, both side handles 4 can be removed, or omitted, and the power cutting tool simply grasped between the rear handle 2 and the forward handle 4'. Removal of one or both of the side handles 4 reduces the widthwise dimension of the power cutting tool, so enabling it to be maneuvered closer to objects being cut. This reduction in widthwise dimension also enables the power tool to be packed, stored and shipped in a smaller shipping carton, with one or two side handles being attached by the ultimate user.

It will be noted that the handle portion 4' is spaced forwardly of the part of the housing 1 containing the motor 10 by an integral strut 318. The strut 318 may extend forwardly from the top of the housing 1 without increasing the height of the housing, so tending to minimize the height of the power tool. With the strut 318, the handle portion 4' forms a crossbar of a T-shape extending forwardly from the housing 1, as clearly seen in FIG. 2. The portion of the housing 1 containing the motor 10 separates, and spaces apart lengthwise of the tool, the rear handle 2 and the forward T-shaped handle 4', 318. As can be clearly seen in FIGS. 2, 3 and 4, the crossbar portion 4' of this T-shaped handle extends in the width-wise direction of the tool for the full width of the housing 1, but not beyond the sides of the housing.

As can be gathered from FIG. 5, an electric lead 29 with plug 39 is fixed to the rear handle part of housing 1 by a tension relief plate 38. Two short cable sections 65 with terminals are used for producing an electrical connection from the on-off switch 3' to the electric motor 10. The motor 10, housed in housing 1 and on whose armature shaft 11 is located a fan wheel 13 (see FIG. 6), is mounted in tower construction manner upright on an upper, metallic partial housing 9 of the gear arrangement. The lower and outer end of the armature shaft is formed as a pinion 12 and extends downwardly through partial housing 9 and projects through longitudinal slots 16 and 19 of the cutting blade holder 15, 18. The lower end of the armature shaft 11 is mounted in a bearing 14 (see FIG. 6) in a lower, metallic partial housing 9'

As can in particular be gathered from FIG. 5, the cutting blade holders 15, 18 have a cross-like configuration and, in addition to the longitudinal slots 16, 19, have guidance slots 17, 20 at right angles thereto. It can be seen that the longitudinal slots 16, 19 are not separated by a web from the guidance slots 17, 20. Thus, when the cutting blade holders 15, 18 are longitudinally displaced, the armature shaft 11 passes out of an area of the longitudinal slots 16, 19, through the area of guidance slots 17, 20, and then into the opposite, other area of longitudinal slots 16, 19.

Parallel to the armature shaft 11, in an area closer to handle opening 2, a bearing spindle 23 extends through the partial housing 9. The spindle 23 is rotatably mounted at both ends in bearing bushes 66 in partial housing 9, 9', and has non-rotatably secured thereon a gear 24, the latter meshing with pinion 12.

The gear 24 is located between the two cutting blade holders 15, 18 and its bearing spindle 23 extends in the same way as armature shaft 11 through longitudinal slots 16, 19. The length of these slots 16, 19 is selected in such a way that, in a manner to be described hereinafter, the cutting blade holders 15, 18 reciprocate over their entire travel, in the drawing planes of FIGS. 6 and 7, in the direction of the longitudinal extension or axis of each holder. On radially opposite sides of the gear 24 are fitted eccentric pins 25, 27, on whose outer ends are rotatably mounted sliding pieces 26, 28. In the normal use position of the saw shown in FIGS. 1 and 6, sliding piece 26 is positioned above the gear 24 and sliding piece 28 below gear 24. Sliding piece 26 engages in the transverse guide slot 17 of the upper cutting blade holder 15, and sliding piece 28 in the guide slot 20 of the lower cutting blade holder 18. Therefore, the distance between the two cutting blade holders 15, 18 is only about the thickness of the gear 24.

The length of each sliding piece 26, 28 corresponds to at least twice the width of the longitudinal slot 16, 19 plus the diameter of the associated eccentric pin. This ensures that each sliding piece 26, 28 is reliably guided in any position in the associated guidance slot 17, 20 and does not tilt towards the longitudinal extend of the respective longitudinal slot 16, 19 in the transition region where the slots intersect.

The eccentric pins 25, 27 are located on a diagonal through the central axis of gear 24 and have the same radial spacing from the bearing spindle 23.

The cutting blade holders 15, 18 are supported by two bearing blocks 21, 22 each having two parallel slots 69, 79 separated by a web. The height and width of slots 69, 70 is chosen in such a way that each elongated, cross-sectionally substantially rectangular cutting blade holder 15, 18 passes through the same with a slight clearance, so that there is a good longitudinal guidance for the holders 15, 18. The bearing blocks 21, 22 are inserted respectively on the rear and front ends of the partial housing 9, 9', and are secured by dovetail guides or similar guidance grooves which prevent tilting of said bearing blocks 21, 22 during reciprocation of the blades 7.

Figure 6:
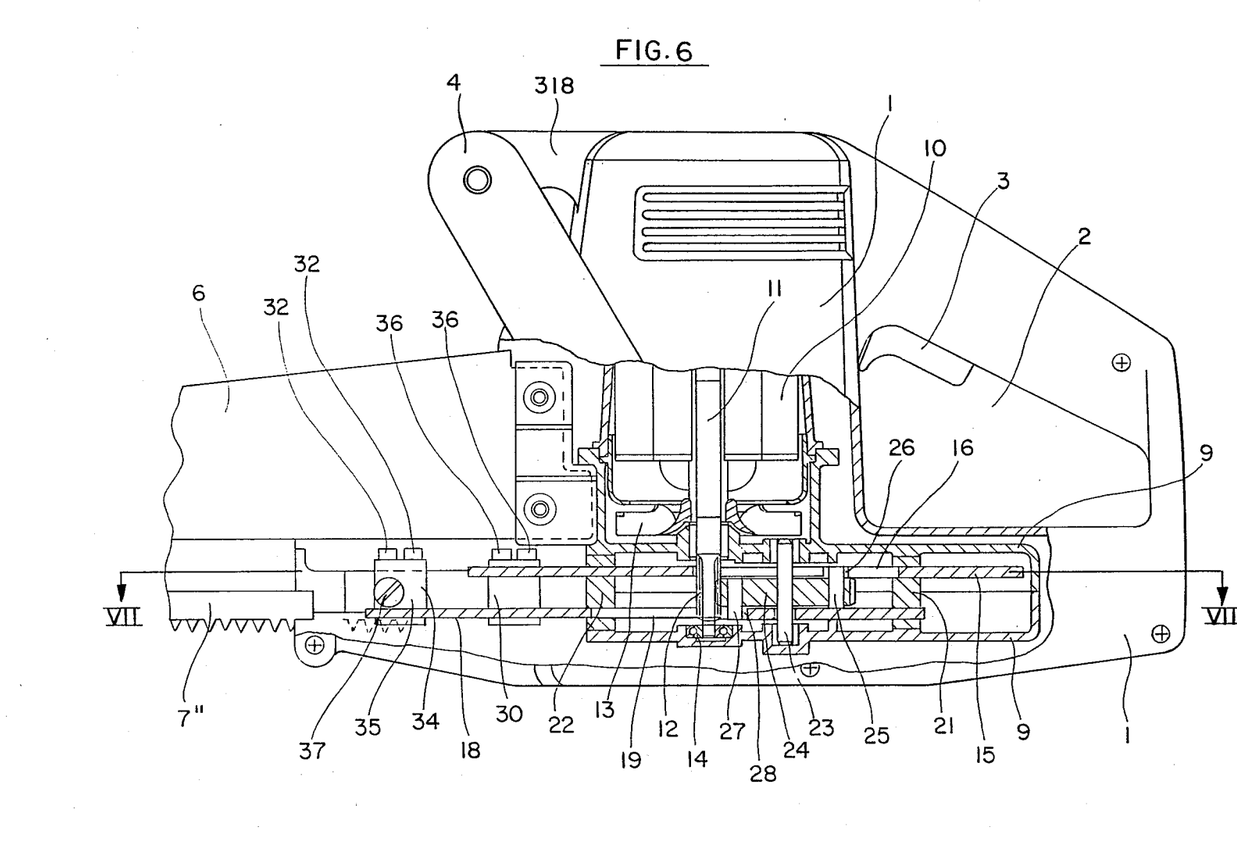
FIG. 6 is a partial side view on a larger scale of the saw of FIG. 1, partly broken away and partly in section to show the motor, gearing and cutting blade holders.
Figure 7:
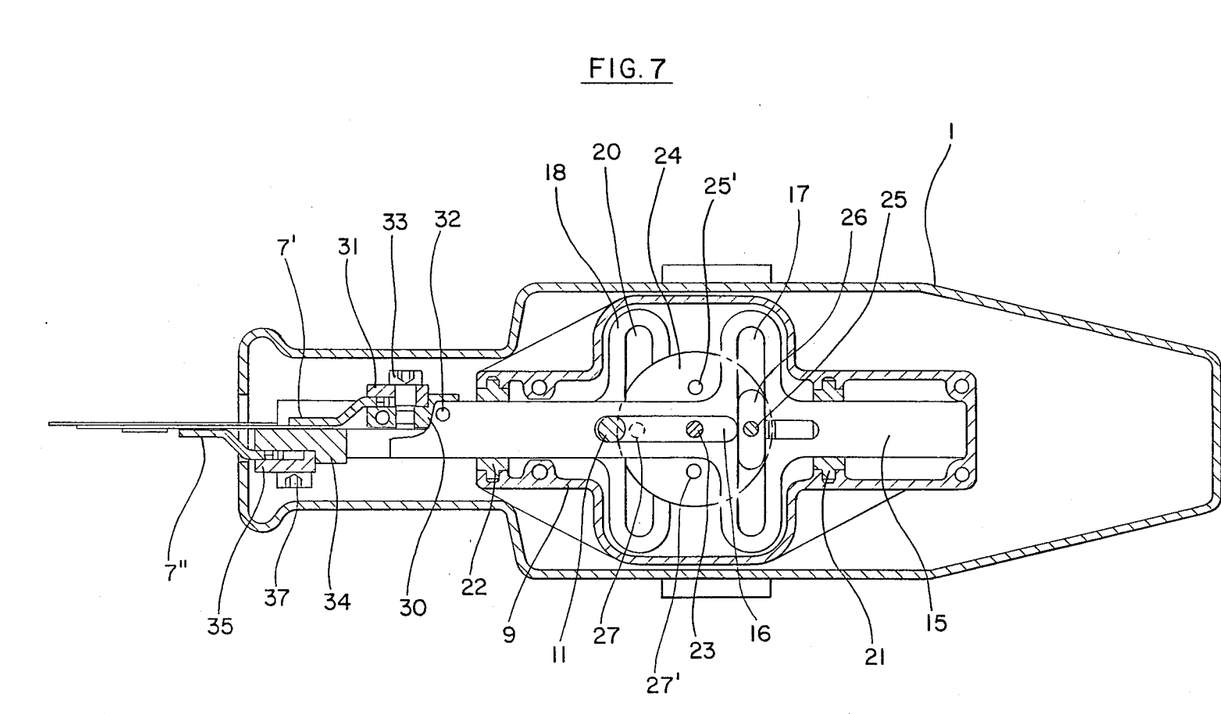
FIG. 7 is a section along the one VII—VII of FIG. 6.

On the ends of the cutting blade holders 15, 18 projecting forwardly out of the partial housing 9, 9', and located to the left in FIGS. 6 and 7, are mounted cutting blade fixtures in the form of clamps. These clamps comprise clamping blocks 30, 34 fixed by means of screws 32, 36 to the cutting blade holders, and clamping pieces 31, 35 pressable towards opposite sides of the holders 15, 18 by a single clamping bolt 33 or 37. As shown in FIG. 7, between the clamping block 30 and clamping piece 31 is secured an offset end of the right-hand saw blade 7'. Correspondingly, the rear end of the offset portion of the left-hand saw blade 7" is secured between clamping block 34 and clamping piece 35. The saw blade shafts are secured to these outwardly offset ends, for example by welding, and the cutting blade portions of the saw blades are thus located immediately adjacent to one another. FIG. 6 shows a preferred arrangement of the screws 32 and 36, this being modified from the arrangement in FIG. 5.

When the armature shaft 11 is driven by motor 10, it rotates gear 24 via the pinion 12, so that eccentric pins 25, 27 perform a rotary movement about the central axis of bearing spindle 23. As a result of this rotary movement, there is a corresponding displacement of sliding pieces 26, 28 which oscillate backwards and forwards in guidance slots 17, 20. Due to the rotary movement of the gear 24, the sliding pieces 26, 28 reciprocate the associated cutting blade holders 15, 18 in the direction of the longitudinal extension or axis of the holder. If, in this connection, it is assumed that the movement starts from the position according to FIG. 7, then on rotation of the gear 24 the cutting blade holder 15 is displaced to the left from its outer right-hand position in FIG. 7, and the cutting blade holder 18 is displaced to the right from its outer left-hand position in FIG. 7, i.e. cutting blade holders 15 and 18 are oppositely reciprocated. The travel or stroke of the two cutting blade holders is the same, because the spacing of the associated eccentric pins 25, 27 from the bearing spindle 23 of gear 24 is the same. During the oscillation of sliding pieces 26, 28 in guidance slots 17, 20, the sliding pieces cross over the longitudinal slots 16, 19 without this impairing the movement of the sliding pieces. This is because, as a result of their dimensions, the sliding pieces are always reliably guided in guidance slots 17, 20 and cannot tilt in the crossing region with the longitudinal slots 16, 19.

As indicated in FIG. 7, additional pairs of bores 25', 27'can be provided in the gear 24. These bores 25', 27' are located closer to the bearing spindle 23 than the eccentric pins 25, 27, but have in each case the same spacing from bearing spindle 23. Thus, if eccentric pins 25, 27 are inserted in bores 25', 27', with an otherwise substantially identical construction of the saw, there will be a smaller travel or stroke of the cutting blade holders 15 and 18. This enables the saw to be converted to a shorter reciprocating stroke of the cutting blades 7 if desired.

The plate-like support plate 6, whose construction will be described hereinafter, is fixed to an upward projection 5 (see FIG. 5) by means of holes 87 provided on its rear mounting end. Projection 5 is formed on the front end of partial housing part 9 and has a rear reinforcing rib 71. Formed-on or mounted screw bushes 72, for receiving clamping bolts 73, extend through a vertical wall of the projection 5, and these bolts extend through the mounting holes 87 of support plate 6.

The construction of the support plate 6 and the saw blades 7, as well as their interaction, can best be seen from FIGS. 8 to 12.

As shown, support plate 6, which at its end having the mounting holes 87 is higher than at the opposite end (see (FIG. 8), comprises two individual, shaped plates 53', 54' (FIG. 10), which are interconnected by spot welding. This leads to a high stability against twisting and bending. Plates 53', 54' can be made from steel or aluminum and so cause good heat dissipation from the cutting blades. In the lower region, plates 53', 54' are outwardly stepped so as to form parallel support sections 53, 54 with an intermediate cavity formed therebetween. This cavity accommodates the upper regions of the two saw blades 7', 7".

Figure 10:
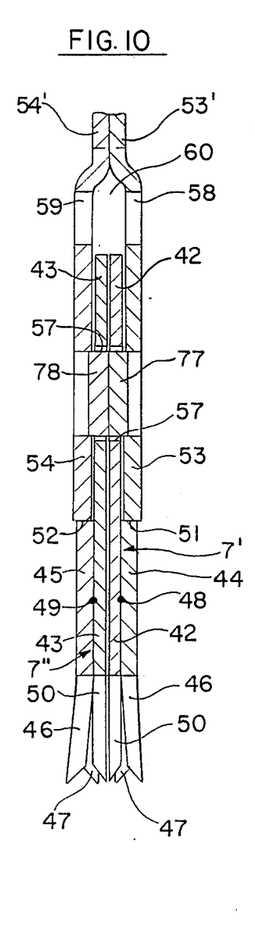
FIG. 10 is a section along a lower part of the line X—X of FIG. 9.
Figure 11:
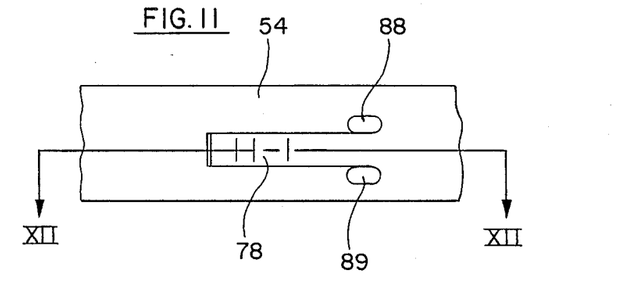
FIG. 11 is a fragmentary view, on a larger scale of a detail in circle XI in FIG. 9.

As can in particular be gathered from FIG. 10, the saw blades in each case comprise a main inner section 42, 43 and a separate reduced height outer section 44, 45 which, as indicated at 48 or 49, are connect<d by spot welding. The upper edge of reduced height section 44 or 45 of the unit constituted by section 44 or 45 and main section 42 or 43 forms a longitudinal shoulder 51 or 52. In operation, the shoulders 51, 52 are supported on, and slide along, the lower edges of the support sections 53, 54 (see FIG. 10), respectively. Whereas, as can also be gathered from FIG. 10, the upper edges of the main sections 42, 43 terminate below the stepped portions at the upper end of support sections 53, 54, so that a free space 60 is formed above the main sections 42, 43. This ensures that the main sections 42, 43 are not supported or contacted on their upper edges.

On the lower edges of sections 44, 45 are formed saw teeth 46, 47. The saw teeth 46 are set outwardly, so that they project beyond the outer face of the associated blade section 44, 45, and consequently produce a cut in the workpiece which is wider than the maximum material thickness of the two saw blades. The saw teeth 47 on sections 44 and 45 are set inwardly, so that they extend into the area below the associated main section 42, 43.

On the main sections 42, 43 are located non-set saw teeth 50 ground in upwardly and outwardly sloping manner from their lower edges.

Figure 9:
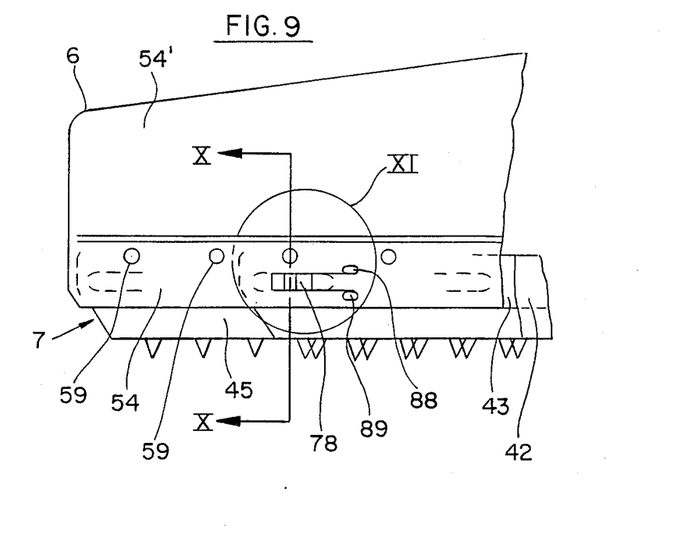
FIG. 9 is a partial view of the front portion of the support plate of FIG. 8 with inserted saw blades.

Adjacent their forward ends, the saw blades have longitudinal slots 57 (FIG. 5) running parallel to the longitudinal shoulders 51, 52 and the end regions of these slots 57 are indicated in broken line form in FIG. 9. Leaf spring strips 77, 78 (FIGS. 9 to 12), constructed in a manner to be described hereinafter on support plate 6, extend into these longitudinal slots. The saw blades 7 are guided at the front area of the support sections 53, 54 in longitudinally reciprocatable manner by and between the leaf spring strips 77, 78. These leaf spring strips 77, 78 also prevent the release of the saw blades from the support plates 6. The rear ends of the saw blades are fixed to the cutting blade holders 15, 18 in the manner described hereinbefore.

In operation, when the saw teeth 46, 47, 50 of the saw blades engage with a workpiece, so forcing the saw blades towards the support plate 6, displacement of the saw blades into the support plate 6 is prevented by the longitudinal shoulders 51, 52 of the saw blades. The support sections 53, 54 exert a downward supporting force on these longitudinal shoulders. These forces exerted downwards on the longitudinal shoulders 51, 52, particularly if as shown, each outside section 44, 45 and each inner main section 42, 43 have the same thickness or sections 44, 45 are less thick than the main sections 42, 43, lead to a torque which presses together the saw blades in their lower region carrying the saw teeth, so that the non-set saw teeth 50 are pressed against one another. Moreover, an upwardly and outwardly directed force acts on the outwardly set saw teeth 46 due to the engagement with the workpiece, particularly as the saw teeth 46 are also ground in outwardly inclined manner from top to bottom. This latter force acts in the manner of forcing apart the saw blades in the vicinity of saw teeth 50. However, saw teeth 47 are set inwards and have ground edge sloping from top to bottom and also inwards, so that an upwardly and inwardly acting force occurs thereon which counteracts the separating force for the saw blades through saw teeth 46. A corresponding force also acts on saw teeth 50 which, as a result of the grinding thereof inclined outwardly and upwardly from the inside, act upwardly and inwardly.

The shape and positioning of the saw teeth 46, 47, 50 are matched so that a torque is produced on the two saw blades in the vicinity of saw teeth 50 through the forces acting on saw teeth 46, 47, 50 and by the supporting forces acting on longitudinal shoulders 51, 52. The torque pressed together the saw blades in this area, so that saw teeth 50 and the area of the main sections 42, 43 adjacent to the teeth 50 are firmly pressed together in operation, even without maintaining close tolerances. Consequently, the risk of the saw blades being separated by material penetrating between them is effectively eliminated.

Figure 12:
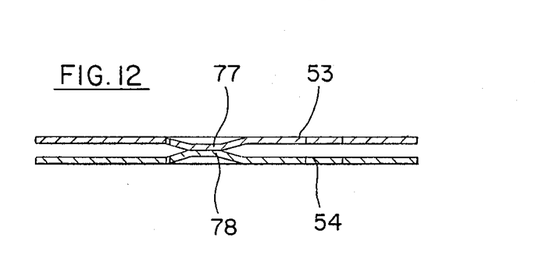
FIG. 12 is a partial section along the line XII—XII of FIG. 11, the saw blades being omitted.

As has already been stated, by means of the leaf spring strips 77, 78, the saw blades are held between the support sections 53, 54 of support plate 6. These leaf spring strips are cut out of the walls of support sections 53, 54 by punching or stamping, so that the strips 77, 78 are only connected by their right-hand ends in FIGS. 9, 11 and 12 with the wall of the particular support section 53, 54. Adjacent to the connection of these strips, and for reducing any notch effect, openings 88, 89 are formed in the supports sections 53, 54 above and below each strip and on the forward side of the respective connection. During the punching operation, the leaf spring strips 77, 78 are deformed in such a way that their central regions curve inwards and are concavely shaped, as can be seen in FIG. 12, so that the strips are urged against each other and there is reciprocal support thereof. They can consequently be forced apart by the insertion longitudinally of the main sections 42, 43 of the saw blades between support sections 53, 54, and the saw blades can be so positioned that their slots 57 are located in the vicinity of the leaf spring strips 77, 78, the latter then snapping into the slots 57 to secure the saw blades against vertical displacements (FIG. 10). It will be noticed that the forward and rear portions of each strip 77, 78 flare outwardly away from each other to facilitate insertion (and removal) of the blades.

As the leaf spring strips 77, 78 are produced during the stamping operation by cutting in, i.e. without any material removal, their upper and lower edges in operation are supported on the resulting boundary upper and lower edges of the slots so formed in the walls of supports sections 53, 54. Thus, in operation there can be no vertical displacement (FIG. 10) of strips 77, 78 i.e. they provide a high stability for the supporting of the forward portions of the saw blades.

For removing the saw blades, the user has to loosen them from the cutting blades holders 15, 18 and then displace the saw blades in such a way that the leaf spring strips 77, 78 are resiliently displaced outwardly and are forced out of the slots 57 in main sections 42, 43 of the saw blades. The saw blades can then be slid out from between the support sections 53, 54.

Figure 8:
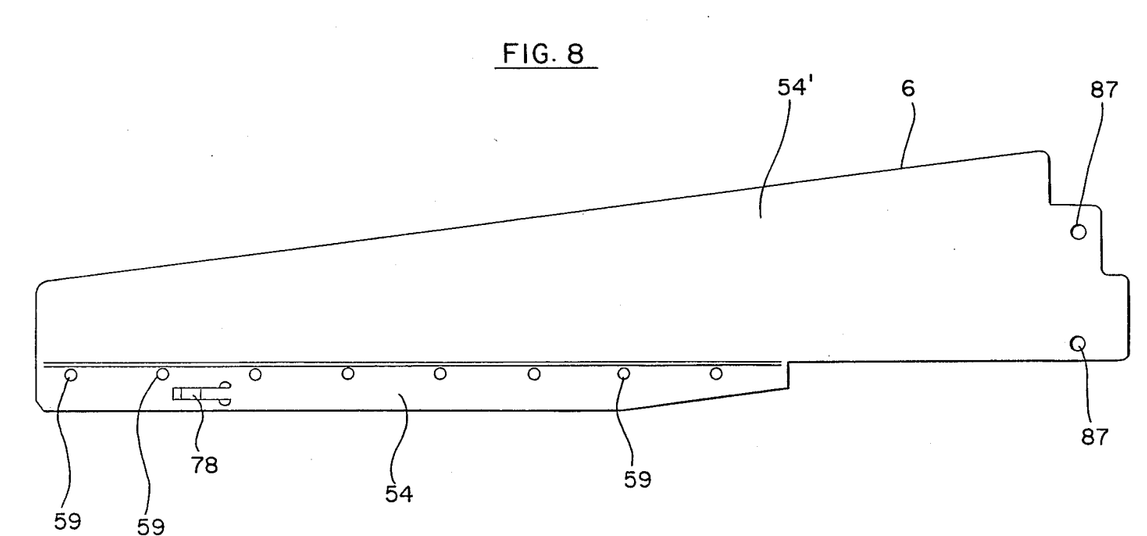
FIG. 8 is a side view of the support plate of the saw of FIGS. 1 to 7.

As can be gathered from FIGS. 8 to 10, openings 58, 59, in the form of through bores, are provided in support sections 53, 54 above the upper edges of the main sections 42, 43 of the saw blades. The openings 58, 59 effect communication of the free space 60 (FIG. 10) with the outside of the support sections 53, 54. These openings permit the discharge of cut material, which in operation may enter between the support sections 53, 54 and the blades, and could lead to operational problems if allowed to collect in the space 60.

Figure 13:
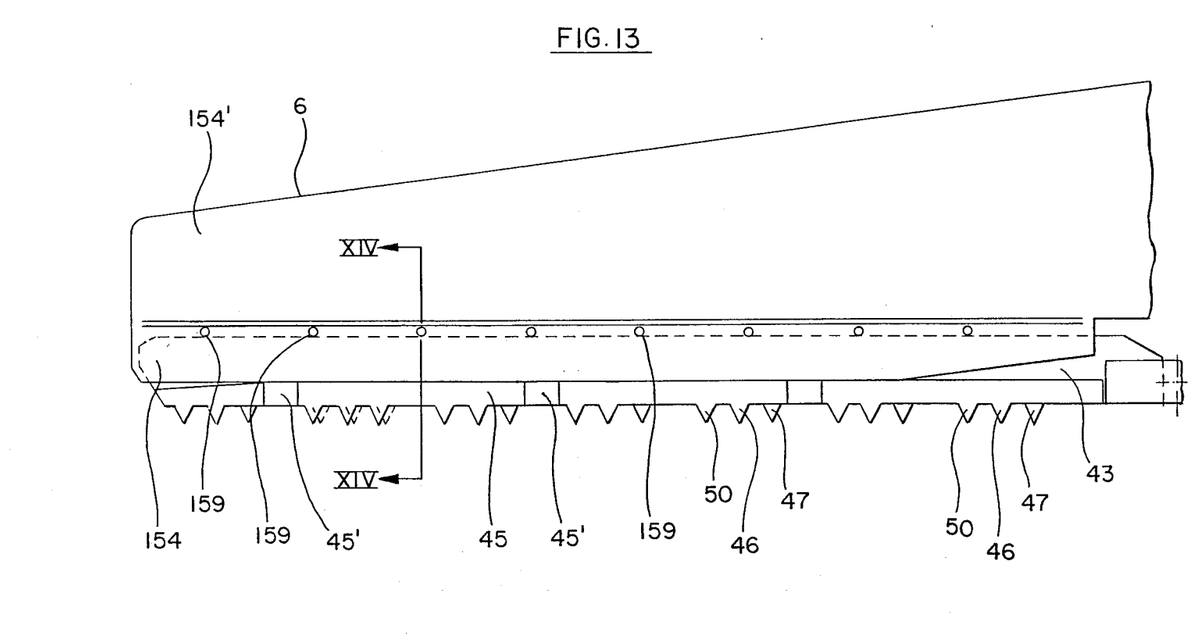
FIG. 13 is a partial side view of another support plate with inserted saw blades.
Figure 14:
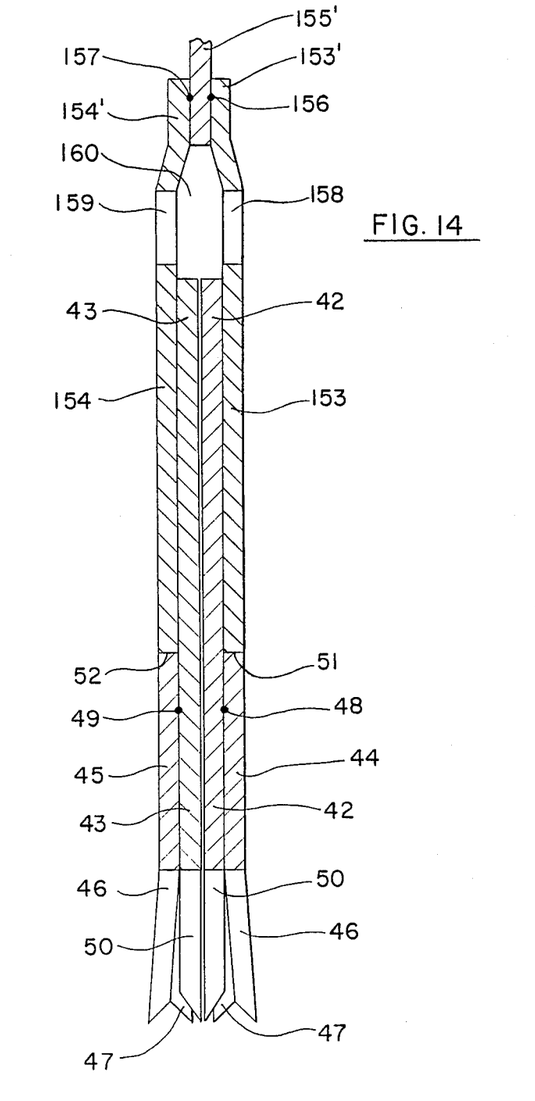
FIG. 14 is a lower part of the section along the line XIV—XIV of FIG. 13.

FIGS. 13 and 14 show a support plate which is somewhat modified compared with that of FIGS. 8 to 12, and in which modified saw blades are inserted. The same parts as those in FIGS. 8 to 12 are given the same references in FIGS. 13 and 14 and corresponding parts generally have their reference numerals increased by 100.

It should be noted that FIG. 13 does not show the leaf spring strip for securing the adjacent saw blade. It is pointed out in this connection that it is possible to choose a different type of retaining mounting of the saw blades in the front region of the support plate. For example, it would be possible to provide a rivet extending through the support sections 153, 154 and the reception space located between them; in their main section 42, 43 the saw blades could then each have a forwardly open slot to permit the insertion of the saw blades over the rivets.

The support plate according to FIGS. 13 and 14 comprises three partial plates 153', 155' and 154' which, as indicated at 156 and 157, are joined by spot welding. The central plate 155' does not extend down to the bottom edge of the support plate, but ends where the two outer plates 153' and 154' are outwardly displaced, or stepped apart, so as to form the spaced-apart support sections 153, 154. The saw blades, that is their main sections 42, 43, are inserted in the cavity so formed between the support sections 153, 154.

The free space 160 above main sections 42, 43 is once again connected by cross-bores 158,159 to the outside of support sections 153, 154, so that cut material can be removed out of the free space 160 through these bores 158, 159. The cross-bores 158, 159 (and also the cross-bores 58,59) are preferably aligned in pairs 158, 159.

To aid removal of cut material from the saw teeth, it is possible to provide in sections 44, 45 grooves or channels 45'(FIG. 13) extending from the saw teeth to the longitudinal shoulders 51, 52, this enabling the cut material to be removed upwards on the outside of the blades. These grooves can, for example, be created by forming the blade outer sections 44, 45 from a plurality of partial lengthwise sections attached to the main and inner blade sections 42, 43 in spaced apart relationship; in this way the grooves 45' are formed between these longitudinally spaced apart partial sections.

When manufacturing a support plate as shown in FIGS. 8 to 10, it can be difficult to bend outwardly and form outwardly directed steps in the two plates, forming the supporting sections 53, 54, with close tolerances so that a predetermined width of the cavity between the supporting sections 53, 54 is obtained. Such close tolerances are desirable for closely enclosing the upper parts of the saw blades between support sections 53, 54. Further, rigidity of a support plate 6 comprising two individual plates 53', 54' as shown in FIGS. 8 to 10 can be insufficient for certain uses. However, the use of individual stepped plates 53', 54'(or 153', 154' in FIG. 14) is advantageous to reduce the weight of the support plate 6, and so therefore the weight of the saw. These stepped plates can be made of relatively thin steel or aluminum plate so that the combined thickness of the two plates is substantially less than using a single thick plate and machining a blade cavity therein. Due to the steps in the two individual plates, the combined thickness of the two plates can be of the order of the combined thickness of the main and inner portions 42, 43 of the saw blades 7, see, for example, the upper portion of FIG. 10. This is because the steps at the top of the support sections 44, 45 enable an adequate blade containing cavity to be defined and also provide strengthening reinforcement of these thin plates.

Figure 15:
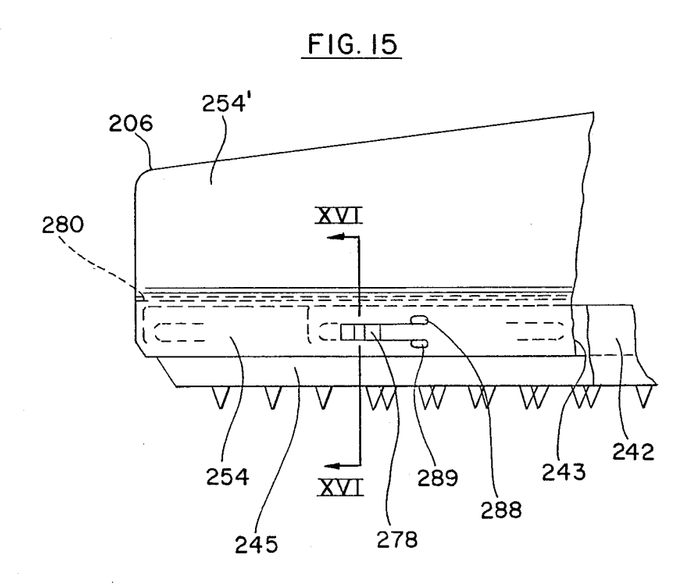
FIG. 15 is a partial side view similar to FIG. 9 of a modified support plate with inserted blades.
Figure 16:
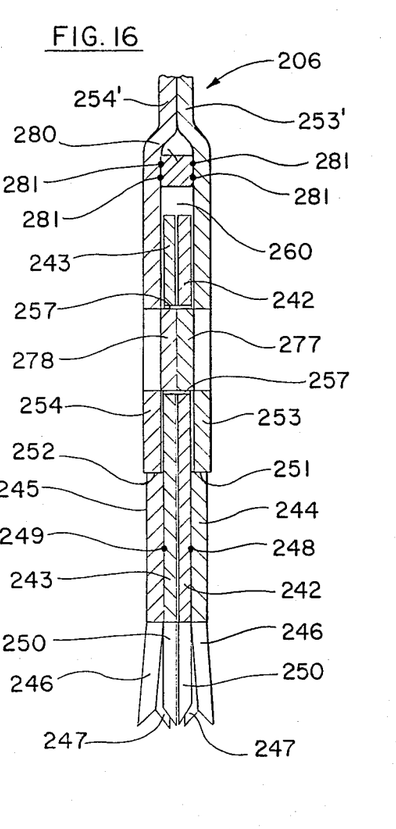
FIG. 16 is a section along the line XVI—XVI of FIG. 15.

To improve the rigidity of the support plate 6, a steel bar or strip 280 may be incorporated as shown in FIGS. 15 and 16 in which the same parts as in FIGS. 9 and 10 are given reference numerals increased by 200 over the reference numerals used in FIGS. 9 and 10.

As can be recognized, particularly from FIG. 16, the steel bar 280 is rectangular in cross-section and is located between the support sections 253, 254 formed by the outwardly bent and stepped lower parts of the two individual plates 253', 254' constituting the support plate 206. The steel bar 280 is located above the upper edges of the main sections 242, 243 of the saw blades so that a free space 260 is provided between such upper edges and the steel bar 280. Therefore, the saw blades are supported by the lower edges of the supporting sections 253, 254 which are in engagement with the longitudinal shoulders 251, 252 of the outer sections 244, 245 of the saw blades.

The steel bar 280 is located just beneath the bent transitional area of the plates 253' and 254', that is just below the outward steps, and is connected to the support sections 253, 254 by spot welding as indicated at 281. Thereby, the width of the cavity (which is also the width of the free space 60 at the top of the cavity) between the support sections 253 and 254 is exactly defined by the width of the steel bar 280; any inaccuracies occurring during the bending action (to form the steps) are automatically compensated or removed. Further, the lowermost connection area of support sections 253, 254 has been moved nearer to the saw blades compared to the structure of FIGS. 8 to 10. Since, the saw blades transmit forces against the support sections 253, 254, the rigidity of support plate 206 is considerably increased by locating this lowermost connection area nearer to the saw blades.

It should be noted that in the embodiment of FIGS. 15 and 16 through-bores for removal of cut material from the open space 260, i.e. through-bores corresponding to the bores 58, 59 in FIGS. 8 to 10, are omitted. However, such through-bores can, of course, be also provided in the embodiment of FIGS. 15 and 16 below the bar 280.

It will be appreciated from the foregoing that a versatile saw, particularly useful for cutting and logging trees, is provided which has an improved cutting action and also has a lighter-weight yet robust saw blade and support plate assembly. As will be realized, both the construction of the saw blade and the support plate, contribute to this improvement.

The saw blades are each formed from two separate and toothed blade sections, preferably spot wielded together. Each blade is thin, and is of low height relative to its length and to the height of the support plate. This, together with the formation of the support plate including two individual stepped plates, again preferably spot welded together, enables a reduction in weight of the assembly of the support plate and saw blades while still providing sufficient rigidity for this assembly. The saw blades in this assembly may each be as thin as 1mm to 2mm, and the moment of resistance against bending of the composite support plate may be in the range of 7.5 to 30 times that of each saw blade. Preferably, the resistance to sideways bending of the support plate is 10 to 25 times that of each saw blade.

Each saw blade has teeth comprising three different types, inside, intermediate and outside teeth. These different teeth, respectively 50, 47 and 46, are so shaped that the resultant force on these teeth from the wood when cutting is directed inwards towards the otter saw blade, so contributing to the two blades not separating laterally at the teeth when cutting. This is important, since lateral separation of the cutting edges of the two blades in operation would allow wood cuttings, e.g. sawdust, to penetrate between the blades so gradually forcing the bottom cutting edges of the blades apart; this would result in a wider and less clean cut being made and also would tend to damage the blades—eventually with jamming of the blades in the support plate. In the teeth arrangements shown, the outside tooth 46 determines the width of the cut but has a force exerted on it tending to separate the saw blades; however, the intermediate tooth 47 and the inside tooth 50 are both oppositely inclined in grinding to the outside tooth 46 and so have two forces exerted on them which are both in a direction tending to force the saw blades together. Thus, the resultant force on the three teeth 50, 47, 46 is in an inward direction forcing the cutting edges of the two blades together. As shown in FIG. 13, preferably the different teeth are grouped together along the length of each saw blade with a tooth 46 in the middle of each group and a tooth 50 and a tooth 47 on each side thereof.

An important feature of forcing the two saw blades together has been found to be the arrangement of the relative width and positioning of the shoulder 51, 52 on each blade to enable this to produce a strong torque on each blade tending to force together the cutting edges of the blades. In this respect it is important to have a free space, such as space 60, above the inner and main section 42, 43 of the blades; this prevents any downward force or pressure on the upper edges of the blades. Also, the outwardly positioned shoulders 51, 52 have a lateral width approximately equal to or less than half the maximum thickness, or lateral width, of the saw blade, and the lower edges of the individual plates 53, 54 of the support plate 6 contact these shoulders 51, 52 over the entire lateral width of the shoulders. This provides in operation a resultant reaction force of each individual plate 53, 54 on the associated shoulder 51, 52, which force is downward and parallel to the height wise direction of the blade, but is offset outwardly of the central plane of the blade by at least half the lateral thickness of the shoulder 51, 52. As the shoulder has a width not larger than half the maximum thickness of the saw blade, this resultant downward force is located at least halfway between the central plane of the blade and the outside plane of the blade; thus, this resultant force produces a torque on the blade tending to rotate the cutting edge of the blade inwardly towards the other blade. Due to the above location of the resultant force being substantially displaced from the center plane of the blade, a strong torque is exhibited on both blades firmly pressing their teeth together during cutting operations.

FIGS. 17, 18 and 19 show three modifications of the manner of mounting the side handles whereby only the bottom screw 304 is employed. In each of these embodiments, the orifice in side surface 310 of the spacing handle portion 4' is adapted to cooperate with the shape of an interlock protrusion, extending from the upper leg of the side handle, to form a releasable connection.

In FIG. 17, the upper leg of each side handle 4a has a relieved wing-shaped interlock protrusion 322 which, in a particular angular orientation about the central axis 324 of this upper leg, can be inserted through a specially shaped orifice 320 in the side surface 310. Once so inserted, a small angular rotation of the side handle 4a about the axis 324 will effect engagement of the relieved portions of the wing-shaped protrusion 322 behind portions of the side surface 310 adjacent side portions of the orifice 320, so locking the upper leg of the side handle 4a to the handle portion 4'. The angular orientation of the protrusion 322 and the shape of the orifice 320 are arranged to effect alignment of the screw aperture 314 with the boss orifice 316 when this interlocking angular rotation is completed. The direction of insertion of the protrusion 322 into the orifice 320, and then the interlocking rotation of the side handle 4a, are indicated by the broken line 326 and the arrow 328, respectively. Once the upper leg of the handle 4a is so interlocked with the handle portion 4', the screw 304 is then inserted as before to secure the lower leg of the handle 4a to the boss 312. The handle 4a can simply be removed, when desired, by unscrewing and removing the screw 304, rotating the handle in the opposite direction to the arrow 328, and then withdrawing the upper leg along the axis 324.

In the FIG. 18 embodiment, the side surface 310 has a diametrically disposed slot-like orifice 340. The upper leg 341 of the side handle 4b has a somewhat T-shaped protrusion 342. To assemble the side handle 4b to the housing the handle 4b is angularly orientated to enable the crossbar of the T-shaped protrusion 342 to enter through the slot 340. The handle is then rotated about the axis 324 to align the screw aperture 314 with the boss orifice 316, and then secured by insertion of the screw 304. The movement of the upper leg 341 during this assembly is indicated by the line 326 and arrow 328.

The FIG. 19 embodiment is similar to those of FIGS. 17 and 18, except the orifice 344 in the handle portion 4' is keyhole shaped, and the protrusion on the upper leg 341 of the side handle 4c is a headed stud 346 disposed below the central axis 324 of the upper leg 341. With this embodiment, no rotation of the side handle 4c is necessary during assembling to and disassembling from the power tool. The head of the stud 346 is inserted through the larger top portion of the orifice 344 and then moved downwards to effect the interlock, this movement being indicated by the rightangled arrow 348.

Figure 1:
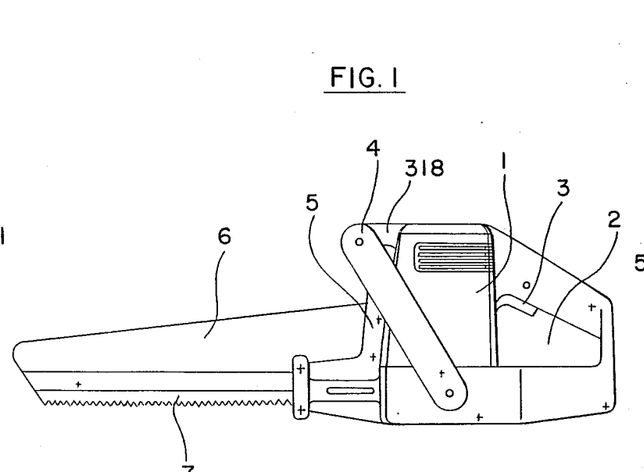
FIG. 1 is a side view of a powered tool according to the invention in the form of an electrically driven, portable saw.
Figure 2:
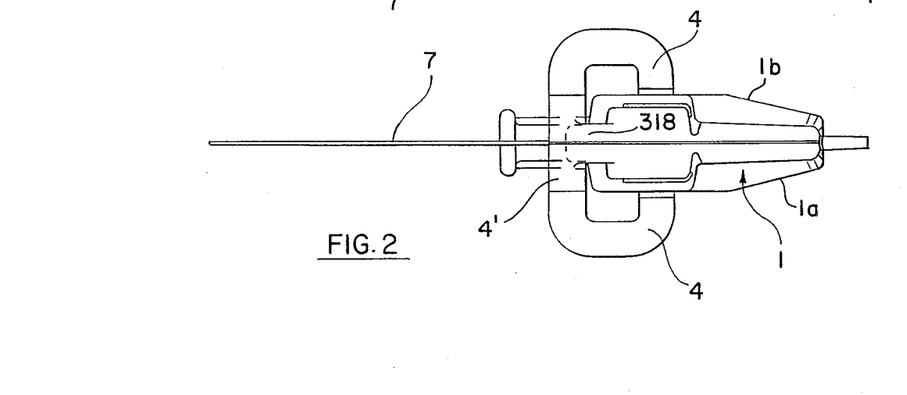
FIG. 2 is a plan view of the saw of FIG. 1.

As will readily be appreciated, the unit comprising housing 1 with rear handle 2, upper forward handle 4', and detachable side handles 4, 4a, 4b or 4c could not only be employed in a reciprocating saw as in FIG. 1, but could also be used for a chain saw, a hedge trimmer or other hand-held power cutting implement (particularly for use outside such as in a yard or garden) by suitable modification of the housing 1 and the drive arrangement therein.

The above described embodiments, of course, are not to be construed as limiting the breadth of the present invention. Modifications, and other alternative constructions, will be apparent which are within the spirit and scope of the invention as defined in the appended claims.

What is claimed is:
1. A hand-held power tool, comprising:
a housing containing a motor;
means for cutting extending forwardly from said housing in a lengthwise direction of said tool;
transmission means for driving said cutting means from said motor;

a rear handle extending rearwardly from said housing in said lengthwise direction;

a front handle spaced from said rear handle and extending forwardly from an upper portion of said housing;

a pair of looped side handles attachable to and detachable from opposite sides of said tool at a location between said rear handle and said cutting means;

each side handle having upper and lower legs;

upper securing means for securing end portions of the upper legs to said front handle; and lower securing means for securing end portions of the lower legs to said housing.

2. The tool of claim wherein said front handle is T-shaped having a forwardly extending central strut with a crossbar.

3. The tool of claim 1, wherein said housing comprises two half shells, said front handle is integral with said housing, and each half shell has a portion forming one side of said front handle.

4. The tool of claim 1, wherein each said side handle is U-shaped.

5. The tool of claim 1, wherein said upper securing means comprises a screw which passes inside and along the upper leg of at least one of the side handles.

6. The tool of claim 1, wherein one of said securing means comprises interlocking elements on said front handle and one of the legs of each side handle.

7. The tool of claim 6, wherein said interlocking elements comprise an aperture, and a protrusion engageable in and displaceable relative to said aperture, said protrusion being displaced relative to said aperture after being inserted therein to effect an interlock between said protrusion and said aperture.

8. The tool of claim 7, wherein said aperture is of keyhole shape and said protrusion is a headed stud.

9. The tool of claim 7, wherein said aperture comprises a slot and said protrusion is T-shaped.

10. The tool of claim 6, wherein the other of said securing means includes a screw.

11. The tool of claim 5, wherein said lower securing means includes a screw which passes through and along the lower leg of one of said side handles and into said housing in a direction transverse to said lengthwise direction.

12. The tool of claim 11, wherein the screw of said upper securing means passes into said front handle in a direction transverse to said lengthwise direction.

13. The tool of claim 12, wherein said upper securing means comprises two screws, one for each side handle, and said lower securing means comprises two further screws, one for each side handle.

14. A hand-held power tool, comprising:

a housing supporting a motor;

means for cutting, said cutting means extending in a lengthwise direction forwardly from said housing and being connected to said motor to be driven thereby;

a forward handle mounted on said housing;

said handle comprising a strut connected with and extending from said housing, and a crossbar mounted on said strut and extending transversely thereto and to said lengthwise direction;

said crossbar having at opposite ends side handle mounting surfaces; and means, associated with each of said mounting surfaces, for enabling a leg of a side handle to be secured to said crossbar with an end of said leg abutting one of said mounting surfaces.

15. The tool of claim 14, wherein said leg forms an extension of said crossbar when secured thereto.

16. The tool of claim 15, wherein said mounting surfaces are planar and extend transversely to said crossbar.

17. The tool of claim 16, wherein said enabling means comprises an orifice in each of said mounting surfaces.

18. The tool of claim 17, wherein each said orifice is keyhole shaped.

19. The tool of claim 17, wherein each said orifice comprises a slot.

20. The tool of claim 17, wherein each said orifice comprises a hole for threadedly accepting a screw.

21. The tool of claim 14, including two U-shaped side handles disposed on opposite sides of said housing, said handles having upper legs and lower legs, said upper legs being detachably secured to and forming extensions of said crossbar, and said lower legs being detachably secured to said housing.

22. The tool of claim 21, further comprising a rear handle extending rearwardly from said housing, said forward handle being spaced from said rear handle and being disposed between said rear handle and said cutting means.

23. A hand-held power tool, comprising:

a housing supporting a motor;

means for cutting, extending forwardly from said housing in a lengthwise direction;

said motor being drivingly connected to said cutting means to effect cutting movement thereof;

a rear handle extending rearwardly from said housing in said lengthwise direction;

a forward handle disposed forwardly of said rear handle;

said forward handle comprising a strut connected to and extending from said housing, and a crossbar mounted on said strut and extending transversely thereto and to said lengthwise direction;

said crossbar having at opposite ends side handle mounting surfaces;

said housing having on opposite sides thereof side handle mounting bosses;

a pair of U-shaped side handles each having upper and lower legs;

upper means for releasably securing said upper legs to said crossbar with ends of said upper legs being mounted on said side handle mounting surfaces and said upper legs forming oppositely directed extensions of said crossbar; and lower means for releasably securing said lower legs to said housing with ends of said lower legs being mounted on said side handle mounting bosses.

24. The tool of claim 23, wherein said upper and lower means comprise screws extending through said upper and lower legs.

25. The tool of claim 23, wherein said cutting means comprises at least one reciprocated cutting blade.

26. The tool of claim 23, wherein said cutting means comprises two superimposed, toothed, cutting blades.

27. The tool of claim 26, wherein said strut extends forwardly from an upper part of said housing, and at least one of said upper and lower means includes a screw which extends transversely to said lengthwise direction and extends through at least one of the legs of one of the side handles.

28. The tool of claim 23, wherein said crossbar extends in a widthwise direction of said tool across the width of said housing for the width thereof, said strut and said crossbar defining a T shape.

* * * * *